United States Patent [19]
Schuman et al.

[11] 3,888,854
[45] June 10, 1975

[54] BIS-TRIAZINE COMPOUNDS

[75] Inventors: Paul D. Schuman, Hawthorne;
Eugene C. Stump, Jr., Gainesville, both of Fla.

[73] Assignee: PCR, Inc., Gainesville, Fla.

[22] Filed: Nov. 18, 1971

[21] Appl. No.: 200,212

[52] U.S. Cl. ............................ 260/248 CS; 252/78
[51] Int. Cl. ........................................ C07d 55/50
[58] Field of Search ............................. 260/248 CS

[56] References Cited
UNITED STATES PATENTS

| | | | |
|---|---|---|---|
| 3,708,483 | 1/1973 | Anderson et al. | 260/248 |
| 3,810,874 | 5/1974 | Mitsch et al. | 260/78 |
| 3,816,416 | 6/1974 | Croft et al. | 260/248 |
| 3,845,051 | 10/1974 | Zollinger | 260/248 |

*Primary Examiner*—John M. Ford
*Attorney, Agent, or Firm*—Cushman, Darby & Cushman

[57] ABSTRACT

Compounds of the formula

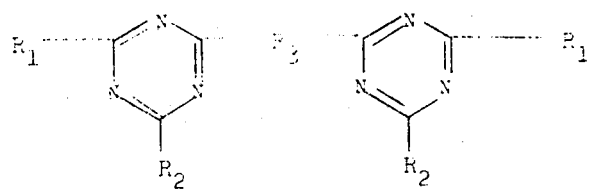

are disclosed, wherein $R_1$, $R_2$ and $R_3$ are fluorinated or chlorofluorinated alkyl or ether or polyether groups. These compounds are thermally and oxidatively highly stable fluids, useful as hydraulic fluids in, e.g., aircraft.

11 Claims, No Drawings

BIS-TRIAZINE COMPOUNDS

BACKGROUND OF THE INVENTION

The copending application of Schuman et al., Ser. No. 733,304, filed May 31, 1968 now U.S. Pat. No. 3,654,273, discloses the preparation of high molecular weight fluorinated alkylsubstituted monotriazines.

British Pat. No. 1,156,912 discloses the preparation of low molecular weight partially fluorinated alkyl-substituted bis-triazines.

SUMMARY OF THE INVENTION

The present invention relates to fluorinated alkyl-substituted bis-triazines having relatively high molecular weights and a wide range of fluid properties which can be obtained through proper selection of various substituents. The perfluoroalkyl substituted bis-triazines are of the formula:

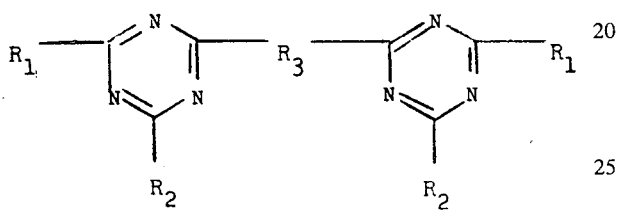

wherein $R_1$, $R_2$ and $R_3$ are defined hereinbelow.

DESCRIPTION OF THE INVENTION

The perfluorinated $\alpha,\omega$-bis(2,4-dialkyl-s-triazinyl)alkanes of the present invention are stable fluids which exhibit good resistance to thermal and oxidative degradation. These fluids are useful as hydraulic fluids, exhibiting excellent lubricity properties, combined with other highly desirable properties, such as low volatility, wide fluid ranges, fire resistance, excellent stability, and minimum corrosiveness.

The perfluorinated $\alpha,\omega$-bis(2,4-dialkyl-s-triazinyl)alkanes of the present invention have the formula

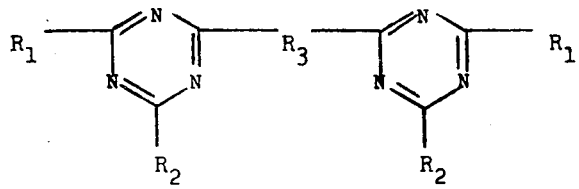

wherein $R_1$ and $R_2$ are independently selected from the group consisting of a. perfluorinated alkyl of 1 – 12 carbon atoms, wherein the alkyl group may be straight chain or branched chain, preferably of the formula $$C_n F_{(2n+1)}$$

wherein $n'$ is a number from 1 – 13, such as perfluoromethyl, perfluoroisopropyl, perfluorobutyl, perfluorooctyl, perfluorododecyl and the like.

b. perhalogenated chlorofluoroalkyl of 1 – 11 carbon atoms, wherein the alkyl group may be straight chain or branched chain, preferably of the formula $$Cl-\begin{bmatrix}F\\|\\C\\|\\F\end{bmatrix}-\begin{bmatrix}F\\|\\C\\|\\Cl\end{bmatrix}_m-\begin{matrix}F\\|\\C\\|\\F\end{matrix}-$$

wherein $m$ is a number from 0 – 5, such as, for instance, chlorodifluoromethyl, dichloropentafluoropropyl, and the like.

c. Groups of the formula $$R_6-\underset{R_7}{\overset{R_5}{\underset{|}{C}}}-O-\left(\underset{R_4}{\overset{R_4}{\underset{|}{C}}}-CF_2-O\right)_p-\underset{R_4}{\overset{R_4}{\underset{|}{C}}}-$$

wherein each $R_4$ is independently F, Cl, or perfluoroalkyl of 1 to 5 carbon atoms, and $R_5$, $R_6$ and $R_7$ are independently F, Cl, perfluoroalkyl of 1 to 7 carbon atoms, $\omega$-hydroperfluoroalkyl of 2 to about 12 carbon atoms, such as $\omega$-hydroperfluoroethyl, $\omega$-hydroperfluorohexyl, and the like, or perhalogenated chlorofluoroalkyl of 1 to 7 carbon atoms, and p is a number from 1 to 20, such as

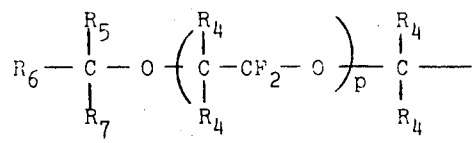

$$C_3F_7O(CF-CF_2-O)_2\overset{CF_3}{\underset{|}{CF}}-,$$

and the like.

d. $\omega$-hydroperfluoroalkyl of 3 to about 13 carbon atoms, such as $\omega$-hydroperfluoropropyl, $\omega$-hydroperfluoroheptyl, or $\omega$-hydroperfluorotridecyl, and $R_3$ is $$-\underset{R_8}{\overset{R_8}{\underset{|}{C}}}-\left(OCF_2-\underset{R_8}{\overset{R_8}{\underset{|}{C}}}\right)_x-O-(CF_2)_n-O-\left(\underset{R_8}{\overset{R_8}{\underset{|}{C}}}-CF_2-O\right)_y-\underset{R_8}{\overset{R_8}{\underset{|}{C}}}-$$

$$-(CF_2)_n-O-\left(\underset{R_8}{\overset{R_8}{\underset{|}{C}}}-CF_2-O\right)_z-\underset{R_8}{\overset{R_8}{\underset{|}{C}}}-$$

perfluoroalkylene of 2 to about 20 carbon atoms, perhalogenated chlorofluoroalkylene of 2 to about 20 carbon atoms, and mixtures thereof, wherein each $R_8$ is independently F, Cl perhalogenated chlorofluoroalkyl of 1 to 5 carbon atoms, such as $CF_2Cl-$, $ClCF_2CFCl-$, and the like, or perfluoroalkyl of 1 – 5 carbon atoms such as $CF_3$, $C_2F_5$, iso—$C_3F_7$, and n—$C_3F_7$, $x$, $y$ and $z$ are independently numbers from 0 – 20 and n is a number from 2 – 20.

The "dumbbell" triazines of the present invention have distinct advantages over the materials produced by the prior art acknowledged above. The most significant advantages are that higher molecular weights may be obtained, thereby reducing volatility, which is a significant factor in certain lubrication applications, and the fact that a wide range of fluid properties can be obtained due to the increased number of possible substituents.

Compounds of the present invention are readily made through a ring closure process. A nitrile, which may be obtained by the method disclosed in the aforesaid U.S. Pat. No. 3,654,273 is reacted with an excess of ammonia to form an amidine, following the reaction scheme:

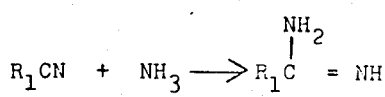

The reaction is preferably conducted at about the reflux temperature of ammonia and atmospheric pressure, although temperatures of −50° to +40°C. may be used, and higher and lower pressures may be used, without, however, any significant advantage over atmospheric pressure. The fluorinated nitriles used as starting materials are produced by reaction of the corresponding fluorinated acyl fluorides with ammonia, followed by dehydration of the resulting amide with phosphorous pentoxide.

Excess ammonia is removed from the amidine produced above and then a stoichiometric amount of a dinitrile is reacted with the amidine to form a bis-imidoylamidine following the general reaction scheme:

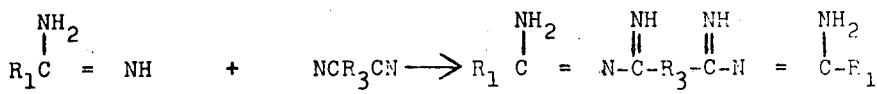

This reaction is preferably conducted at room temperature and atmospheric pressure, although temperatures of 15° to 50°C. may be used. In addition, although not preferred, the pressure may be higher or lower than atmospheric. The dinitrile may be prepared according to the method of U.S. Pat. No. 3,317,484.

The bis-imidolyamidine is then subjected to a ring closure step by adding thereto an excess, generally about 10 – 50 percent or more of a fluorinated anhydride of the formula $$(R_2CO)_2O$$

or an acid fluoride of the formula $R_2COF$, according to the reaction scheme:

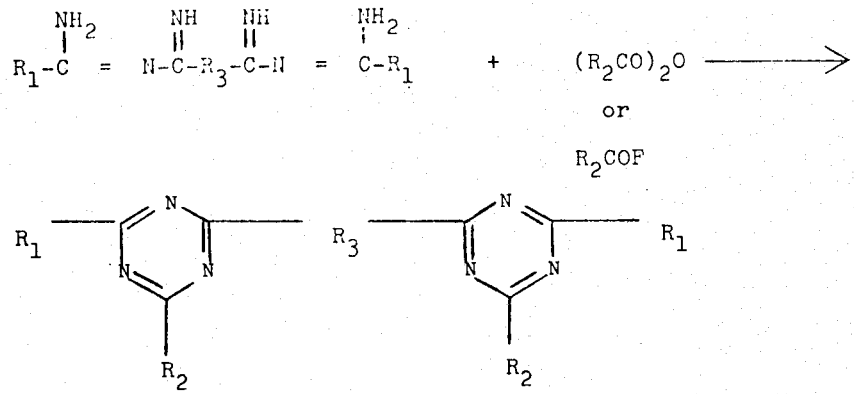
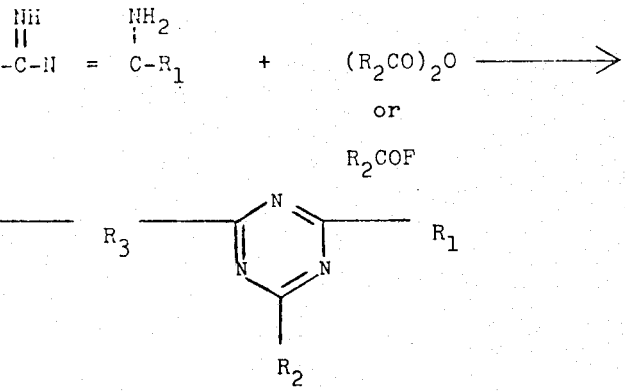

The reaction with the acid fluoride should be in the presence of a HF acceptor, such as sodium fluoride or the like. The acid fluoride may be prepared according to the method of U.S. Pat. No. 3,250,808. These reactions are preferably conducted in an inert solvent, generally a perhalogenated alkane, at room temperature and atmospheric pressure, although higher and lower pressures may be used, and temperatures of 0°C. to the boiling point of the acid fluoride may be used. The triazine product is recovered from the reaction mixture by conventional processing, such as filtration and/or distillation.

EXAMPLES OF THE INVENTION

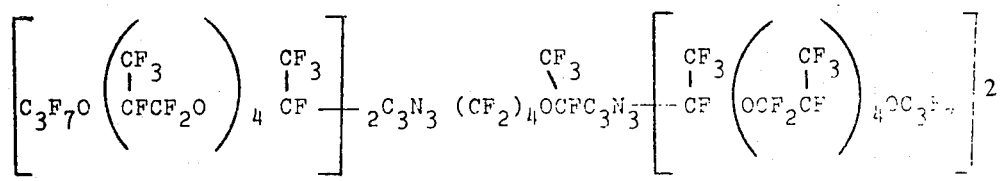
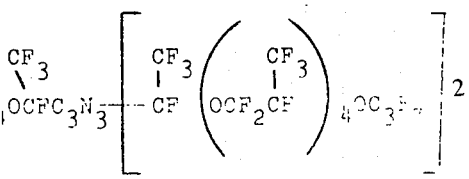

An excess of ammonia (approximately 20 ml) was condensed into a 100 ml flask, equipped with a stirrer, addition funnel and dry-ice cooled condenser fitted with a CaSO₄ drying tube. 19.5 g of the compound

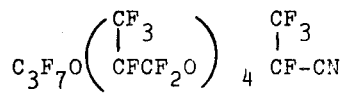

(0.02 moles) was then added dropwise to the flask. When the addition was complete, the condenser was removed and the contents of the flask were allowed to warm to room temperature, with boiling off of the excess ammonia. The flask was placed under reduced pressure to remove the last traces of unreacted ammonia from the product, an amidine. 4.2 g of dinitrile of the formula

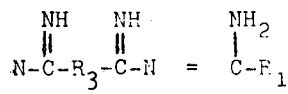

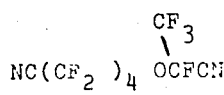

(0.01 mole) were added dropwise at room temperature to the amidine in the flask. The resulting product was an imidolyamidine, as confirmed by infrared spectroscopy.

The imidolyamidine was dissolved in 20 ml of 1,2,2-trifluoro-1,1,2-trichloroethane and was added dropwise to 60 g of an acid fluoride of the formula

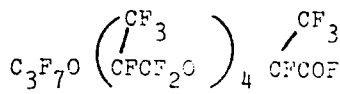

(0.06 moles) which had been stirred with 10 g of dry, powdered, sodium fluoride. The resulting mixture was then filtered and the filtrate was distilled to produce 26.2 g of the bis-triazine of the above formula, boiling at 245° – 265°C./0.1 mm pressure, in 61 percent yield. Redistillation produced 19.7 g of the triazine, boiling at 256° – 265°C./0.1 mm pressure. Analytical data from the triazine is recorded in Table 1 below and physical properties of the triazine are set forth in Table 2 below.

EXAMPLES 2 – 11

Using the procedure of Example 1, but with the starting compound indicated in Table 1, other perfluorinated α,ω-bis(2,4-dialkyl-s-triazinyl)alkanes were prepared. The physical properties of these triazines is set forth in Table 2. In Examples 2, 3, 5 and 7; the starting dinitirle was a mixture of isomers, having the indicated molar proportions of the respective isomers. In Example 6 and 11, a mixture of isomers again was used, wherein the mixture contained various compounds falling within the scope of the formulas set forth below.

TABLE 1

| EX. | $R_1$ | $R_2$ | $R_3$ | Yield % | B.P. °C./mm. | Theory %C. %N | Found %C %N |
|---|---|---|---|---|---|---|---|
| 1 | $C_3F_7O(\overset{CF_3}{\overset{\|}{C}}FCF_2)_4\overset{CF_3}{\overset{\|}{C}}F-$ | $C_3F_7O(\overset{CF_3}{\overset{\|}{C}}FCF_2O)_4\overset{CF_3}{\overset{\|}{C}}F-$ | $-(CF_2)_4O\overset{CF_3}{\overset{\|}{C}}F-$ | 61 | 256–265 /0.1 | 22.49 1.97 | 22.27 2.16 |
| 2 | " | " | 30%—$-(CF_2)_4O\overset{CF_3}{\overset{\|}{C}}FCF_2O\overset{CF_3}{\overset{\|}{C}}F-$<br>70%—$-\overset{CF_3}{\overset{\|}{C}}FO(CF_2)_5O\overset{CF_3}{\overset{\|}{C}}F-$ | 62 | 278–282 /0.3 | 2246 1.89 | 21.91 2.09 |
| 3 | " | " | 10%—$-(CF_2)_4O(\overset{CF_3}{\overset{\|}{C}}FCF_2O)_2\overset{CF_3}{\overset{\|}{C}}F-$<br>90%—$-\overset{CF_3}{\overset{\|}{C}}FO(CF_2)_5O\overset{CF_3}{\overset{\|}{C}}FCF_2O\overset{CF_3}{\overset{\|}{C}}F-$ | 57 | 270–295 /0.2 | 22.43 1.83 | 22.41 2.22 |
| 4 | $C_3F_7O\overset{CF_3}{\overset{\|}{C}}FCF_2O\overset{CF_3}{\overset{\|}{C}}F-$ | $C_3F_7O\overset{CF_3}{\overset{\|}{C}}FCF_2O\overset{CF_3}{\overset{\|}{C}}F-$ | $-(CF_2)_4O\overset{CF_3}{\overset{\|}{C}}F-$ | 59 | 168–175 /0.1 | 23.20 3.69 | 23.04 4.43 |
| 5 | " | " | 30%—$-(CF_2)_4O\overset{CF_3}{\overset{\|}{C}}FCF_2O\overset{CF_3}{\overset{\|}{C}}F-$<br>70%—$-\overset{CF_3}{\overset{\|}{C}}FO(CF_2)_5O\overset{CF_3}{\overset{\|}{C}}F-$ | 41 | 174–176 /0.2 | 23.10 3.66 | 23.25 3.75 |
| 6 | " | " | $-\overset{CF_3}{\overset{\|}{C}}F(OCF_2\overset{CF_3}{\overset{\|}{C}}F)_nO(CF_2)_5O(\overset{CF_3}{\overset{\|}{C}}FCF_2O)_m\overset{CF_3}{\overset{\|}{C}}F-$<br>n + m = 4 | 63 | 218–226 /0.01 | 22.79 2.70 | 22.52 3.06 |
| 7 | $C_3F_7O(\overset{CF_3}{\overset{\|}{C}}FCF_2O)_2\overset{CF_3}{\overset{\|}{C}}F-$ | $C_3F_7O(\overset{CF_3}{\overset{\|}{C}}FCF_2O)_2\overset{CF_3}{\overset{\|}{C}}F-$ | 30%—$-(CF_2)_4O\overset{CF_3}{\overset{\|}{C}}FCF_2O\overset{CF_3}{\overset{\|}{C}}F$<br>70%—$-\overset{CF_3}{\overset{\|}{C}}FO(CF_2)_5O\overset{CF_3}{\overset{\|}{C}}F-$ | 68 | 218–220 /0.4 | 22.79 2.70 | 23.01 2.94 |
| 8 | $C_3F_7O(\overset{CF_3}{\overset{\|}{C}}FCF_2O)_3\overset{CF_3}{\overset{\|}{C}}F-$ | $C_3F_7O(\overset{CF_3}{\overset{\|}{C}}FCF_2O)_3\overset{CF_3}{\overset{\|}{C}}F-$ | " | 57 | 247–253 /0.5 | 22.60 2.23 | 22.70 2.23 |
| 9 | $C_3F_7O(\overset{CF_3}{\overset{\|}{C}}FCF_2O)_4\overset{CF_3}{\overset{\|}{C}}F-$ | $C_3F_7O\overset{CF_3}{\overset{\|}{C}}F-$ | " | 39 | 227–230 /0.4 | 22.79 2.70 | 22.52 3.50 |
| 10 | $C_3F_7O(\overset{CF_3}{\overset{\|}{C}}FCF_2O)_2\overset{CF_3}{\overset{\|}{C}}F-$ | $C_3F_7O(\overset{CF_3}{\overset{\|}{C}}FCF_2O)_2\overset{CF_3}{\overset{\|}{C}}F-$ | $-\overset{CF_3}{\overset{\|}{C}}FOCF_2CF_2O\overset{CF_3}{\overset{\|}{C}}F-$ | 58 | 205–220 /0.1 | 22.75 2.84 | 22.62 3.02 |
| 11 | " | " | $-\overset{CF_3}{\overset{\|}{C}}F(OCF_2\overset{CF_3}{\overset{\|}{C}}F)_xOCF_2CF_2O(\overset{CF_3}{\overset{\|}{C}}FCF_2O)_y\overset{CF_3}{\overset{\|}{C}}F-$<br>x + y = 2 | 67 | 225–235 /0.1 | | |

TABLE 2

PHYSICAL PROPERTIES OF BIS-TRIAZINES

| Example | Viscosity cs 100°F | 140°F | 210°F | ASTM Slope | Temp for 3,000 cs | Pour Point °F |
|---|---|---|---|---|---|---|
| 1 | 138.2 | 44.9 | 11.8 | 0.76 | 33 | 0 |
| 2 | 144.2 | 47.6 | 12.5 | 0.74 | 33 | −5 |
| 3 | 155.6 | 50.6 | 13.2 | 0.74 | 34 | 0 |
| 4 | 54.2 | 17.4 | 4.8 | 0.96 | 24 | −5 |
| 5 | 58.6 | 18.8 | 5.4 | 0.93 | 25 | −10 |
| 6 | 88.1 | 28.5 | 7.9 | 0.84 | 28 | 0 |
| 7 | 83.1 | 27.2 | 7.5 | 0.84 | 27 | −10 |
| 8 | 112.7 | 36.7 | 10.0 | 0.78 | 30 | −10 |
| 9 | 96.4 | 31.3 | 8.3 | 0.82 | 28 | −15 |
| 10 | 70.8 | 23.7 | 6.5 | 0.87 | 24 | −15 |
| 11 | 82.4 | 27.8 | 7.7 | 0.82 | 24 | −25 |

What is claimed is:

1. Compound of the formula:

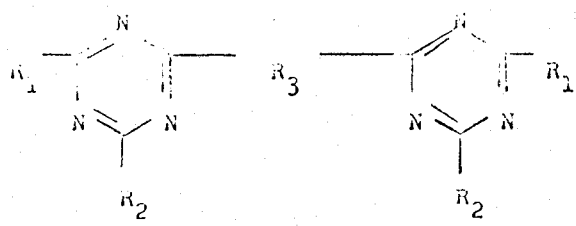

wherein $R_1$ and $R_2$ are independently selected from the group consisting of
a. perfluoroalkyl of 1 – 12 carbon atoms,
b. perhalogenated chlorofluoroalkyl of 1 – 11 carbon atoms, and
c. radicals of the formula:

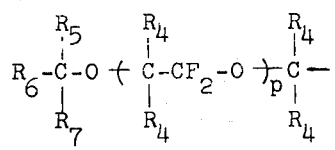

wherein each $R_4$ is independently selected from the group consisting of F, Cl and perfluoroalkyl of 1 to 5 carbon atoms, and $R_5$, $R_6$ and $R_7$ are independently selected from the group consisting of F, Cl, perfluoroalkyl of 1 – 7 carbon atoms, ω-hydroperfluoroalkyl of 2 to about 12 carbon atoms, perhalogenated chlorofluoroalkyl of 1 to 7 carbon atoms, and $p$ is a number from 1 – 20, and ω-hydroperfluoroalkyl of 3 to about 13 carbon atoms, and $R_3$ is a member selected from the group consisting of

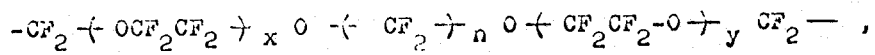

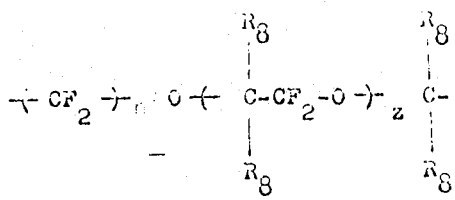

perhalogenated chlorofluoroalkylene of 2 to about 20 carbon atoms, and mixtures thereof, wherein each $R_8$ is independently F, Cl, perfluoroalkyl of 1 – 5 carbon atoms, or perhalogenated chlorofluoroalkyl of 1 – 5 carbon atoms, $x$ and $y$ are independently numbered from 0 – 20, $z$ is a number from 1 to 20, $n$ is a number from 5 to 20, and $n'$ is a number from 2 – 20.

2. The compound as claimed in claim 1, wherein at least one of $R_1$ and $R_2$ are fluorinated alkyl of the formula $$C_{n'} F_{(2n'+1)}$$

wherein $n'$ is a number from 1 – 13.

3. The compound as claimed in claim 1, wherein at least one of $R_1$ and $R_2$ is a chlorofluoroalkyl of the formula

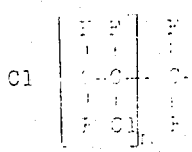

wherein $m$ is a number from 0 – 5.

4. Compound as claimed in claim 1, wherein $R_1$ and $R_2$ are

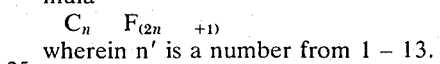

and $R_3$ is

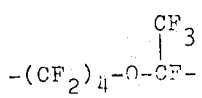

5. Compound as claimed in claim 1, wherein $R_1$ and $R_2$ are

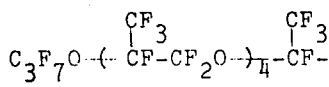
and R₃ is
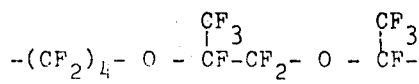
6. Compound as claimed in claim 1, wherein R₁ and R₂ are
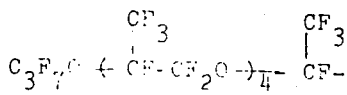
and R₃ is
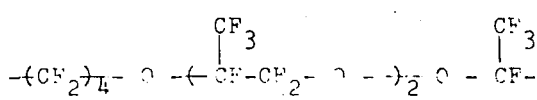
7. Compound as claimed in claim 1, wherein R₁ and R₂ are
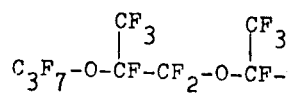
and R₃ is
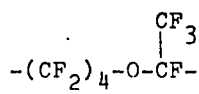
8. Compound as claimed in claim 1, wherein R₁ and R₂ are
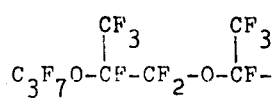
and R₃ is
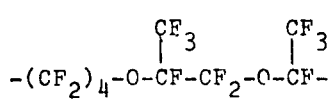
9. Compound as claimed in claim 1, wherein R₁ and R₂ are
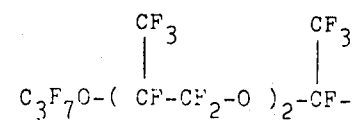
and R₃ is
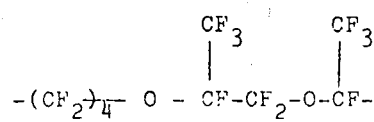
10. Compound as claimed in claim 1, wherein R₁ and R₂ are
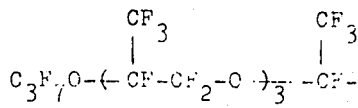
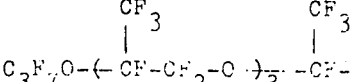
and R₃ is
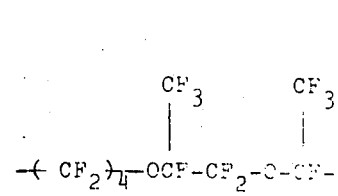
11. Compound as claimed in claim 1, wherein R₁ is
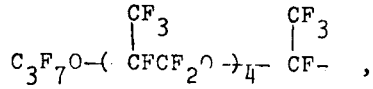
R₂ is
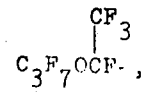
and R₃ is
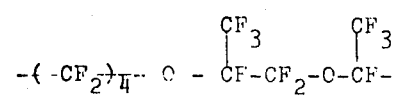
* * * * *